United States Patent [19]

Finnegan et al.

[11] Patent Number: 4,586,964

[45] Date of Patent: May 6, 1986

[54] CORROSION RESISTANT VACUUM BRAZING SHEET

[75] Inventors: Walter D. Finnegan, Walnut Creek; Ralph A. A. Woods, Pleasanton, both of Calif.

[73] Assignee: Kaiser Aluminum & Chemical Corporation, Oakland, Calif.

[21] Appl. No.: 634,529

[22] Filed: Jul. 26, 1984

[51] Int. Cl.$^4$ .............................. C21D 8/00
[52] U.S. Cl. ........................ 148/11.5 A; 148/11.5 Q; 148/437; 148/440; 428/654; 228/263.17
[58] Field of Search .................... 148/11.5 A, 11.5 Q, 148/437, 440; 428/654; 228/228, 263.17

[56] References Cited

U.S. PATENT DOCUMENTS

| | | | |
|---|---|---|---|
| 2,821,014 | 1/1958 | Miller | 428/654 |
| 3,418,090 | 12/1968 | Fritzlen | 428/654 |
| 3,498,849 | 3/1970 | Worthington et al. | 428/654 |
| 3,788,824 | 1/1974 | Singleton, Jr. et al. | 228/263.17 |
| 3,881,879 | 5/1975 | Singleton, Jr. et al. | 420/534 |
| 3,963,454 | 6/1976 | Singleton, Jr. | 228/263.17 |
| 3,994,695 | 11/1976 | Setzer et al. | 420/548 |
| 4,039,298 | 8/1977 | Anthony et al. | 148/438 |
| 4,093,782 | 6/1978 | Anthony et al. | 428/654 |
| 4,167,410 | 9/1979 | Anthony et al. | 420/528 |
| 4,169,553 | 7/1979 | Vernam et al. | 428/654 |
| 4,172,548 | 10/1979 | Nakamura | 148/11.5 A |
| 4,172,923 | 10/1979 | Kawase et al. | 428/654 |
| 4,211,827 | 7/1980 | Pryor et al. | 428/654 |
| 4,339,510 | 7/1982 | Kaifu et al. | 420/529 |
| 4,357,397 | 11/1982 | Baba et al. | 148/11.5 A |

FOREIGN PATENT DOCUMENTS 423599  10/1974  U.S.S.R. .................. 148/11.5 A

Primary Examiner—L. Dewayne Rutledge
Assistant Examiner—Robert L. McDowell
Attorney, Agent, or Firm—Malcolm McQuarrie

[57] ABSTRACT

A novel process for producing aluminum composite sheet products for roll forming and vacuum brazing is disclosed, which provides an unexpected improvement in the corrosion resistance of the brazed product. According to the process, a composite sheet is annealed to a strain-free state after having been rolled to a thickness which is a critical amount greater than the thickness ultimately sought. Following the annealing step, the sheet is cold worked to the desired thickness, the degree of reduction in this final step being within a critical range which provides the improvement in corrosion resistance to the final product after vacuum brazing.

19 Claims, No Drawings

CORROSION RESISTANT VACUUM BRAZING SHEET

BACKGROUND OF THE INVENTION

1. Field of the Invention

This invention relates to brazed aluminum, and particularly to the corrosion properties of vacuum-brazed aluminum materials.

2. Description of the Prior Art

Aluminum has long been known for its resistance to corrosion, a property which renders it a favorable material of construction for a wide variety of purposes. With the relatively recent development of vacuum brazing technology for joining together aluminum parts, aluminum has gained wide acceptance in the manufacture of heat exchangers such as automotive radiators and evaporators for air conditioning units. Vacuum brazing has considerable advantages over the earlier-developed technique of flux brazing, since it avoids the need for a special brazing flux and for expensive cleaning operations to remove the flux after brazing, and it eliminates the possibility of flux contamination corroding the aluminum.

A problem which arises in all brazing operations is the intergranular penetration of core material by certain species in the brazing alloy, notably silicon. When the brazed product is subjected to a corrosive environment, the intergranular regions in the core, where silicon is present in high concentrations, are particularly susceptible to corrosion. In automotive radiators, for example, where the brazing alloy is present only on the exterior surface of the tubes, the salts and moisture from the road are sufficiently corrosive to cause attack from the outside, resulting ultimately in pinhole formation.

This problem has been addressed in the literature in a variety of ways. An early example is Miller, U.S. Pat. No. 2,821,014 (Jan. 28, 1958), where it is disclosed that intergranular corrosion problems in flux and dip brazing are alleviated by adding an interlayer between the structural member portion and the brazing layer. The interlayer is aluminum or an aluminum-base alloy, particularly certain magnesium-containing alloys, having a melting point greater than that of the structural alloy. The solution offered by Singleton et al., U.S. Pat. No. 3,788,824 (Jan. 29, 1974) and its divisional, U.S. Pat. No. 3,881,879 (May 6, 1975), is directed to vacuum brazing, and involves the addition of iron to either the core alloy or the cladding alloy as an alloying element, resulting in improvements in both corrosion resistance and sag resistance. Anthony et al., U.S. Pat. No. 4,039,298 (Aug. 2, 1977) address both flux and vacuum brazing, and disclose a composite of complex and highly specified composition as being particularly beneficial in terms of corrosion properties. The disclosed core alloy contains specified amounts of manganese, copper, chromium, silicon and iron as alloying elements with both a solid solution and an alpha-phase, whereas the alloying elements in the cladding are bismuth and silicon. An additional disclosure by the same patentees appears in U.S. Pat. No. 4,093,782 (June 6, 1978) and its continuation-in-part, U.S. Pat. No. 4,167,410 (Sept. 11, 1979), in which the core alloy contains a specified combination of chromium and manganese, with resultant improvements in both corrosion resistance and sag resistance. A similar disclosure appears in Setzer et al., U.S. Pat. No. 3,994,695 (Nov. 30, 1976), where the core alloy contains a chromium-manganese-zirconium combination, the sole claimed benefit however being an improvement in sag resistance. A combination of copper and titanium as primary alloying elements in the core alloy is disclosed in Kaifu et al., U.S. Pat. No. 4,339,510 (July 13, 1982), as providing a benefit in intergranular corrosion resistance.

A different approach is disclosed by Nakamura, U.S. Pat. No. 4,172,548 (Oct. 30, 1979), in which corrosion following fluxless brazing processes in general (including both vacuum brazing and brazing in an inert atmosphere) is controlled by controlling the grain size of the brazing sheet to at least 60 microns in diameter, achieved by a controlled cold work followed by a full anneal.

To summarize, with the exception of Nakamura, prior investigators have approached the problem by introducing specific elements in the alloy composition, rather than introducing processing modifications. Processing modifications, on the other hand, particularly variations in the combinations, degrees and sequence of strain hardening and annealing, are generally used for controlling the ductility and tensile properties of the final product. Setzer et al., referenced above, demonstrates several of these combinations, ranging from those ending with a fully hardened product (maximum cold work) to those ending with a fully strain-free (annealed) product.

In manufacturing operations which require forming of the sheet into various shapes prior to brazing, a certain degree of ductility is required for the sheet to respond in an appropriate manner to the forming equipment. Examples of such forming processes are roll forming, drawing, spinning and shear forming. Conventional methods of achieving the desired degree of ductility involve a partial anneal of the product after it has been cold rolled down to the final gauge. An explanation and description of this is disclosed by Singleton, U.S. Pat. No. 3,963,454 (June 15, 1976) at column 4, lines 34–58. The partial anneal is controlled to leave the desired amount of cold work remaining in the product.

SUMMARY OF THE INVENTION

It has now been discovered that intergranular corrosion is particularly acute in composites that have been vacuum brazed, much more so than those brazed by other types of brazing. In addition, it has been discovered that the resistance to integranular corrosion is dependent not on the final hardness of the material before brazing but on the method by which the final hardness is achieved. Thus, a product having markedly superior corrosion properties for a given final hardness is achieved by the use of a procedure whereby a full anneal is followed by a controlled cold work, the latter being the final step before forming and brazing. Finally, and in conjunction with these discoveries, it has also been discovered that a final cold work step within certain ranges of reduction depending on the alloy will provide improved corrosion resistance over degrees of cold work falling outside these ranges.

DESCRIPTION OF THE PREFERRED EMBODIMENTS

The process of the present invention is applicable over a wide range of alloys, composites, and processing procedures.

The core alloy may vary widely in composition, although those containing manganese, magnesium or both as the primary alloying elements, i.e., the components present in the highest concentrations other than the aluminum itself, are preferred. The concentrations of these elements in the core alloy may vary widely but typically range from about 0.2% to about 2.0% by weight. Particularly preferred core alloys are those which further contain a small amount of chromium in addition to the primary alloying element(s). Again, the concentration may vary widely, although best results are generally obtained within a range of from about 0.05% to about 0.4% by weight. In further preferred embodiments, the core alloy is a non-heat-treatable alloy, most preferably of the 3XXX series of Aluminum Association designated alloys. Examples are the 3003, 3005 and 3105 alloys.

The cladding alloy (also referred to herein as a "brazing alloy") may be any aluminum alloy capable of flow under typical vacuum brazing conditions to form fillets at the contact points sufficient to produce a sturdy bond. Such alloys will generally contain silicon as the primary alloying element, preferably at a concentration ranging from about 5% to about 15% by weight. Exemplary such alloys are those of the 4XXX series, e.g., 4004, 4043, 4045, 4047, 4104 and 4343.

Cladding alloys which are particularly preferred for their behavior during vacuum brazing operations are those which further contain a gettering agent. The latter is generally an alkali or alkaline earth metal which volatilizes at brazing temperatures and combines in the volatilized state with atmospheric oxygen to prevent such oxygen from combining with the solid surface of the metal article and interfering with the flow of the brazing alloy. The preferred gettering agent is magnesium, generally present in the cladding alloy in an amount ranging from about 0.1 to about 3.0 percent by weight.

The process of the invention is primarily of interest in producing composite aluminum sheet products having a hardness ranging from about one-quarter to about three-quarters hard, hardness being defined as zero hard at the fully annealed state to full hard at the fully strain hardened state. As known to those skilled in the art, full hard is recognized in the industry as being equivalent to the hardness of a product which has been cold worked to a 75% reduction. In preferred embodiments of the invention, the final brazing sheet is approximately one-half hard, i.e., ASTM temper designation H14. In addition, the process of the invention is of particular benefit to brazing sheet products which are intended to be roll-formed into flat tubes such as those used in automobile radiators.

In most applications, the processing steps which precede the final anneal and controlled cold working are a hot working to bond the cladding to the core, a scalping or etching to remove the oxide formed on the surface during the hot working, and a cold working to bring the gauge down to a value somewhat higher than the desired ultimate value, so that the full anneal and final cold working will produce both the hardness and gauge sought. Thus, a first cold working reduction is conducted to leave a critical amount of reduction remaining, annealing is then done to a strain-free state (i.e., full anneal rather than partial), and finally a limited cold working step to achieve the desired gauge.

The strain introduced by the final cold working, provided that it is within the critical range for the particular core alloy, carries the corrosion resistance through the vacuum brazing step. The result is that the ultimate brazed product demonstrates substantially improved corrosion resistance over products of the same hardness made by the conventional process. It has also been discovered that this controlled final cold working increases the degree of flow of the brazing alloy during the brazing step, thus providing stronger fillets.

The cold working and annealing steps may be done according to conventional techniques well known to those skilled in the art. It should be noted, however, that the annealing step is a full anneal, i.e., one which returns the material to a substantially strain-free state. The temperature required to achieve this will vary to some extent depending on the compositions of cladding and core alloys as well as the length of time during which the composite is held at that temperature. In general, however, a temperature of from about 500° F. to about 850° F. (260° C. to 427° C.), for a period of time ranging from about 0.5 hour to about 5 hours, preferably from about 600° F. to about 700° F. (316° C. to 371° C.) for about 1 to 3 hours, will provide the best results.

The critical range of the final cold work step will vary somewhat depending on the amount and type of alloying elements in both the core and the cladding alloys, and will also vary somewhat depending on the processing history of the product prior to the final steps (for instance, the presence, absence or degree of homogenization of the core alloy). In general, however, the critical range extends from about 3.0 percent to about 50 percent reduction after the full anneal. Composites in which the core is comprised of an alloy which contains no more than trace amounts of chromium provide best results over a range of from about 3% to about 20%. Composites in which the core alloy contains in excess of about 0.05% chromium provide best results in the range of about 15% to about 50%.

As mentioned above, the critical steps of the process as well as those which precede and follow them are done according to conventional techniques. In most applications, the cladding layer forms from about 0.1 percent to about 20 percent, preferably from about 1.0 percent to about 15 percent, of the thickness of the entire composite, and is present on one or both sides of the core, depending on the intended use of the brazing sheet. The bonding of the cladding to the core is typically achieved by conventional hot rolling techniques at temperatures ranging from about 450° F. to about 1,000° F. (230° C. to 540° C.). The cladding may be preceded by homogenization of the core typically at a temperature within the approximate range of from about 800° F. to 1150° F. (427° C. to 621° C.), although in some alloys and procedures corrosion resistance will be improved by omitting the homogenization step. Cold working is generally done by rolling, stretching or forming at ambient temperature. In general, the initial cold work step (prior to the full anneal) is done to a reduction of at least about 50%, preferably at least about 80%. Finally, products prepared by the process of the present invention may be vacuum brazed according to conventional techniques. Such techniques are done at a pressure of $10^{-2}$ torr or less, preferably between about $10^{-4}$ and about $10^{-6}$ torr, and at a temperature ranging from about 1,000° F. to about 1,200° F. (540°–650° C.), preferably from about 1060° F. to about 1125° F. (571° C. to 607° C.).

The following examples are offered for purposes of illustration only, and are intended neither to define nor limit the invention in any manner.

EXAMPLE 1

The following experiment demonstrates the unusual susceptibility of vacuum-brazed composites to intergranular corrosion, and the effect of applying a final cold work to the composites.

A brazing sheet product was formed from the following core and cladding alloys:

TABLE 1.1

| TEST MATERIALS | | | |
|---|---|---|---|
| Core Alloy | | Cladding Alloy | |
| Element | Weight % | Element | Weight % |
| Si | .30 | Si | 11.70 |
| Fe | .50 | Fe | .30 |
| Cu | .10 | Cu | .10 |
| Mn | 1.10 | Mn | .05 |
| Mg | .50 | Mg | .15 |
| Zn | .20 | Zn | .04 |
| Ti | .005 | | |
| Al | balance | Al | balance |

The product was 0.020 in. (0.051 cm) thick with the cladding material on both sides, each cladding layer comprising 12% of the total thickness. The product was fully annealed and had been prepared from an ingot which had been homogenized before the cladding layers were added.

Four coupons were cut from the product, each approximately 2×5 in. (5.1×12.7 cm). The first coupon was heated to and held for two minutes at 1100° F. (593° C.) in an air furnace to simulate air-brazing conditions. Of the three remaining coupons, two were reduced by cold rolling, one to a reduction of 5.6% and the other to 8.6%. All three were then heated in a vacuum-brazing furnace at a pressure of $1 \times 10^{-5}$ torr, where they were held at 1100° F. (593° C.) for two minutes.

All four coupons were then tested for corrosion by immersion in a solution consisting of (all figures by weight):

TABLE 1.2

| CORROSION SOLUTION | |
|---|---|
| distilled water | 55% |
| Prestone antifreeze | 45% |
| $Na_2SO_4$ | 55 ppm (as $SO_4^=$) |
| NaCl | 55 ppm (as $Cl^-$) |
| $NaHCO_3$ | 55 ppm (as $HCO_3^-$) |
| $FeCl_3$ | 5.5 ppm (as $Fe^{+++}$) |
| $Cu_2(SO_4)_3$ | 5.5 ppm (as $Cu^{+++}$) | for thirty days, during which time the solution was heated to 194° F. (90° C.) and held at that temperature for one hour every twenty-four hours.

Polished metallographic cross sections were prepared from these coupons. The metallographic sections were etched and photomicrographs were taken and evaluated visually, with the following results: the air-brazed coupon displayed isolated pits in the cladding, the pits not extending into the core; the vacuum-brazed coupon which had not been cold worked displayed a continuous network of corrosion cavities throughout the cladding and extending into the core to a distance of about 25% of the core thickness, clearly defining the grain boundaries; the 5.6% cold reduced coupons exhibited isolated sites of attack that penetrated the core alloys up to about 20% of thickness; and the 8.6% cold reduced coupons exhibited isolated pits that penetrated the core to about 30% of thickness, not defining individual grains.

The comparison demonstrates that vacuum brazing caused a considerably heightened susceptibility of the fully annealed composite to intergranular corrosion in the core alloy than did air brazing, and that this susceptibility was substantially reduced by cold rolling the annealed composite prior to brazing in both of the reductions tested.

EXAMPLE 2

This example demonstrates the difference in corrosion susceptibility between two samples of equivalent hardness, one obtained by cold rolling to the desired gauge followed by a partial anneal (to a temper of H24), the other by cold rolling to a thickness greater than the desired gauge, fully annealing, and finally cold rolling to the desired gauge (the resulting temper being H14).

The test was performed on three products. The first was a commercial sheet consisting of core and cladding alloys as follows (on weight basis):

TABLE 2.1

| TEST MATERIALS | | | |
|---|---|---|---|
| Core Alloy (3003) | | Cladding Alloy (4104) | |
| Element | Weight % | Element | Weight % |
| Si | 0.21 | Si | 10.15 |
| Fe | 0.60 | Fe | 0.19 |
| Cu | 0.14 | Cu | 0.033 |
| Mn | 1.10 | Mn | 0.023 |
| Mg | 0.007 | Mg | 1.43 |
| Cr | 0.002 | Cr | 0.003 |
| Zn | 0.027 | Zn | 0.028 |
| Ti | 0.009 | Ti | 0.009 |
| | | Bi | 0.096 |
| Al | balance | Al | balance |

The core alloy had been homogenized after casting by heating to 1120° F. (604° C.) for at least four hours, then clad on one side and hot rolled to a gauge of 0.10-0.15 in. (0.25-0.38 cm), then cold rolled to a final gauge of 0.015 in. (0.038 cm), and finally partially annealed to a temper of H24.

The second product was prepared in the laboratory but was processed in a manner similar to the first, except that the core alloy contained 0.15% chromium and the homogenization step was eliminated.

The third product (also prepared in the laboratory) was prepared and processed in a manner similar to the second except that the cold rolling step was done to a gauge of 0.0215 in. (0.055 cm), and the anneal was done for two hours at 650° F. (343° C.) and followed by a final cold work of 30% to a final gauge of 0.015 in. (0.038 cm), resulting in a temper of H14.

Rectangular pieces measuring 2.5 by 4.0 in. (6.4 by 10.2 cm) were cut from each product, and placed in a three-chamber vacuum brazing furnace, where they were heated in twelve minutes to 1100° F.±5 (593° C.) and held for two minutes at that temperature and at a pressure of $1 \times 10^{-5}$ torr. The pieces were then further cut into 2.5 in. (6.4 cm) squares, and the nonclad side masked with electroplater's tape. The pieces were then corrosion tested according to ASTM Procedure No. G43 in a 98% humid atmosphere with intermittent exposure to an atomized solution consisting of (on weight basis):

TABLE 2.2

| CORROSION SOLUTION | |
|---|---|
| Component | Amount |
| Synthetic sea salt | 42 g/liter |

TABLE 2.2-continued

| CORROSION SOLUTION | |
|---|---|
| Component | Amount |
| Glacial acetic acid | 10 ml/liter |
| Water | balance | for periods of time ranging from 24 to 200 hours at a temperature of 120° F. (49° C.). The pieces were then rinsed in cold water and cleaned in a solution of chromic and phosphoric acids (ASTM Solution No. G1) at 180° F. (82° C.), and finally baked for at least thirty minutes at 250° F. (121° C.) to remove retained water.

Each square was then pressurized with air at 20 psig (13.8 newtons/cm$^2$) under water and the number of perforations detected by visual observation of streams of bubbles. The number of perforations per piece is shown below as a function of the number of hours in the corrosion solution:

TABLE 2.3

TEST RESULTS
PERFORATIONS PER PIECE AT 20 PSIG

| Composite | | | Hours in Corrosion Test | | | | |
|---|---|---|---|---|---|---|---|
| Core | Cladding | Temper | 12 | 48 | 72 | 96 | 120 |
| 3003 | 4104 | H24 | 12 | 25+ | 25+ | 25+ | |
| 3003 + Cr | 4104 | H24 | 0 | 1 | 13 | 17 | 25+ |
| 3003 + Cr | 4104 | H14 | 0 | 0 | 0 | 1 | 9 |

While an improvement is achieved by the addition of chromium to the core alloy and the elimination of the homogenization step, it is clear that even further improvement is achieved by the modification of the cold work/anneal sequence.

EXAMPLE 3

The following demonstrates the effect of the degree of the final cold work step (preceded by a full anneal according to the process of the invention) on the corrosion characteristics of a particular composite.

The composite used was that described in Example 1. After the full anneal, individual strips of the composite were cold rolled to varying degrees ranging from 3.7 to 28.3% reductions, then placed in the vacuum brazing furnace at $1 \times 10^{-5}$ torr and 1100° F. (593° C.) for two minutes. The strips were then corrosion tested using the solution and procedure described in Example 1 except that the exposure lasted for sixty days. The strips were then cleaned and polished cross sections prepared for metallographic examination. These were etched in a hydrofluoric-sulfuric acid etchant for sixty seconds and photomicrographs were taken and evaluated visually.

The flowability of the brazing (or "filler") alloy was tested on further pieces cut from the same composites after they had been annealed and cold rolled. The pieces were suspended vertically in the vacuum brazing furnace at the conditions enumerated above. The weight of the filler metal that had drained to the lower third (0.5 inch, 12.7 mm) of each piece was then determined and expressed in terms of the total amount present on the piece.

The results, including both filler metal flow and degree of corrosion, are listed in Table 3.1:

TABLE 3.1

TEST RESULTS -
CORROSION AND FILLER METAL FLOW
VS. DEGREE OF COLD REDUCTION

| Percent Reduction | Percent Filler Metal Flow | Appearance in Photomicrograph |
|---|---|---|
| 0 | 27 | cladding reduced to rounded isolated grains about 0.0028 in. (0.007 cm) in diameter, outermost of which appear loose, location of original outer surface line barely perceptible - corrosion extending into core to depth of 40% in form of continuous network of corrosion channels isolating smaller grains about 0.0008 in. (0.002 cm) in diameter |
| 3.7 | 62 | cladding: isolated pits greater than 0.02 in. (0.05 cm) apart - corrosion in core to depth of 3.5% of core thickness |
| 11.8 | 87 | isolated pits in cladding at spacing of about 0.004 in. (0.010 cm) narrowing to thread-like corrosion lines usually extending into core to 25% of core thickness - lines essentially non-interconnecting |
| 15.8 | 63 | |
| 23.6 | 52 | cladding heavily pitted with broad pits about 0.0025-0.0050 in. (0.0064-0.013 cm) wide, narrowing to interconnecting channels extending into core to depth of 25%, defining grains 0.001-0.002 in. (0.003-0.005 cm) in diameter in isolated clusters |

It appears from these observations that optimal results were obtained with final cold reductions of 3.7% to 15.8%.

EXAMPLE 4

A test similar to that of Example 3 was conducted on a composite of the following alloys:

TABLE 4.1

TEST MATERIALS

| Core Alloy | | Cladding Alloy | |
|---|---|---|---|
| Element | Weight % | Element | Weight % |
| Si | .20 | Si | 9.80 |
| Fe | .50 | Fe | 0.25 |
| Cu | .10 | Cu | 0.10 |
| Mn | .25 | Mn | 0.05 |
| Mg | .35 | Mg | 1.15 |
| Cr | .10 | Zn | 0.08 |
| Zn | .40 | Bi | 0.10 |
| Ti | .10 | | |
| Al | balance | Al | balance |

The composite had a total thickness of 0.020 in. (0.05 cm), including a 15% cladding on both sides. The range of cold rolling extended from 3.4% to 26.9%, and the photomicrograph and filler metal flow results were as follows:

TABLE 4.2

TEST RESULTS -
CORROSION AND FILLER METAL FLOW
VS. DEGREE OF COLD WORK

| Percent Reduction | Percent Filler Metal Flow | Appearance in Photomicrograph |
|---|---|---|
| 0 | 38 | approximately half of cladding |

TABLE 4.2-continued
TEST RESULTS -
CORROSION AND FILLER METAL FLOW
VS. DEGREE OF COLD WORK

| Percent Reduction | Percent Filler Metal Flow | Appearance in Photomicrograph |
|---|---|---|
| 3.4 | 6 | reduced to rounded isolated grains 0.0028 in. (0.007 cm) in diameter - clusters of interconnected corrosion channels in core defining flattened grains 0.0004 in. (0.001 cm) in diameter |
| 8.5 | 50 | isolated pits in cladding extending to 75% of cladding thickness - no corrosion in core alloy |
| 11.4 | 57 | pitting extending through cladding and penetrating up to 40% of core thickness |
| 15.3 | 57 | |
| 17.4 | 54 | pitting extending part way through cladding only - no corrosion in core alloy |
| 22.6 | 51 | |
| 26.9 | 56 | pitting extending through cladding and interconnected in core, channels in core up to 0.0004 in. (0.001 cm) in width |

These observations indicate that optimal results were obtained at cold reductions ranging from 8.5% to 22.6%.

EXAMPLE 5

A test similar to that of Examples 3 and 4 was conducted on a composite of the following alloys:

TABLE 5.1
TEST MATERIALS

| Core Alloy (3005) | | Cladding Alloy (4104) | |
|---|---|---|---|
| Element | Weight % | Element | Weight % |
| Si | 0.13 | Si | 9.75 |
| Fe | 0.50 | Fe | 0.24 |
| Cu | 0.11 | Cu | 0.02 |
| Mn | 1.28 | Mn | 0.01 |
| Mg | 0.52 | Mg | 1.40 |
| Cr | 0.01 | Cr | 0.004 |
| Zn | 0.03 | Zn | 0.02 |
| Ti | 0.02 | Ti | 0.01 |
| Al | balance | Al | balance |

The composite was prepared according to the description in Example 2, including homogenization of the core alloy but not including the chromium addition. Final cold reductions ranging from 6.3% to 16.8% were performed, followed by simulated vacuum brazing as described in Example 2. Samples were then exposed to the corrosion solution of Example 2 for periods of time ranging from 24 to 96 hours, then rinsed, cleaned and baked. Finally, the pressure test described in Example 2 was conducted, yielding the following results:

TABLE 5.2
TEST RESULTS -
PERFORATIONS PER PIECE AT 20 PSIG

| Final Cold Reduction (%) | Hours in Corrosion Test | | | |
|---|---|---|---|---|
| | 24 | 48 | 72 | 96 |
| 0 | 0 | 5 | 16 | 20+ |
| 6.3 | | 0 | 0 | 10 |
| 7.4 | | 0 | 0 | 12 |
| 9.1 | | 0 | 1 | 2 |
| 13.7 | | 0 | 0 | 20+ |
| 16.4 | 0 | 8 | 4 | 20+ |
| 16.8 | 0 | 0 | 7 | 20+ |

The tabulated results indicated favorable performance at cold reductions of 6.3% to 13.7%.

EXAMPLE 6

A test similar to that described in Example 5 was conducted, with the modification that the core alloy further contained 0.15% chromium and the core alloy was not homogenized. The pressure test yielded the following results:

TABLE 6.1
TEST RESULTS -
PERFORATIONS PER PIECE AT 20 PSIG

| Final Cold Reduction (%) | Hours in Corrosion Test | | | | | |
|---|---|---|---|---|---|---|
| | 24 | 48 | 72 | 96 | 120 | 144 |
| 6 | 0 | 8 | 25 | 25 | — | — |
| 12 | 0 | 0 | 8 | 12 | 25 | 10 |
| 18 | 0 | 0 | 0 | 0 | 0 | 0 |
| 30 | 0 | 0 | 0 | 0 | 0 | 0 |
| 40 | 0 | 0 | 0 | 0 | 0 | 0 |
| 60 | 0 | 0 | 1 | 5 | 3 | — |
| 75 | 0 | 0 | 6 | 0 | 3 | — |
| 86 | 0 | 0 | 0 | 6 | 2 | — |

Optimal results appear in the tests run at 18 to 40% cold reduction, indicating a range of about 15% to 50%.

The foregoing description is offered primarily for illustrative purposes. It will be readily apparent to those skilled in the art that the particular materials and procedures described herein may be further varied or modified in numerous ways without departing from the spirit and scope of the invention as set forth in the following claims.

What is claimed is:

1. A method of producing a corrosion resistant wrought aluminum composite sheet product for use in vacuum brazing, which comprises:
   (a) cladding an aluminum-base core material containing at most a trace amount of chromium with an aluminum-base brazing alloy;
   (b) rolling said clad material to form a sheet product;
   (c) annealing said sheet product to a substantially strain-free state; and
   (d) cold working said sheet product to a reduction of from about 3% to about 20%.

2. A method according to claim 1 in which said aluminum-base brazing alloy contains silicon as a primary alloying element.

3. A method according to claim 1 in which said aluminum-base core material is an alloy containing manganese, magnesium or both as primary alloying elements.

4. A method according to claim 1 in which said aluminum-base core material is an alloy of the Aluminum Association 3XXX series.

5. A method according to claim 1 in which said aluminum-base brazing alloy is an alloy of the Aluminum Association 4XXX series.

6. A method according to claim 1 in which said aluminum-base brazing alloy contains an alkali or alkaline earth metal gettering agent in an amount sufficient to substantially prevent the formation of oxides on the composite surface during vacuum brazing.

7. A method according to claim 6 in which said gettering agent is magnesium.

8. A method according to claim 1 in which said brazing alloy occupies from about 0.1% to about 20% of the total composite thickness.

9. A method according to claim 1 in which said brazing alloy occupies from about 1% to about 15% of the total composite thickness.

10. A method of producing a brazed aluminum composite sheet product having improved resistance to intergranular corrosion, which comprises:
    (a) cladding an aluminum-base core material containing at most a trace amount of chromium with an aluminum-base brazing alloy containing silicon as a primary alloying element to form a composite having a cladding occupying from about 1% to about 15% of the total composite thickness;
    (b) rolling said composite to form a sheet product;
    (c) annealing said sheet product to a substantially strain-free state;
    (d) cold working said sheet product to a reduction of from about 3% to about 20%; and
    (e) joining said sheet product at its clad surface to a second aluminum-base material by vacuum brazing.

11. A method according to claim 10 in which said aluminum-base core material is a non-heat-treatable alloy of the Aluminum Association 3XXX series; and said aluminum-base cladding alloy is an alloy of the Aluminum Association 4XXX series and further contains from about 0.1% to about 3.0% magnesium.

12. A method according to claim 10 in which said aluminum-base core material contains at least one member selected from the group consisting of manganese an magnesium as primary alloying elements.

13. A method according to claim 10 in which step (e) is conducted at a temperature of from about 1000° F. to about 1200° F. and at a pressure of less than about $10^{-2}$ torr.

14. A method according to claim 10 in which step (e) is conducted at a temperature of from about 1060° F. to about 1125° F. and at a pressure of from about $10^{-4}$ torr to about $10^{-6}$ torr.

15. A method of producing an aluminum tube-and-fin heat exchanger having improved resistance to corrosion, which comprises:
    (a) cladding an aluminum-base core material on one side with an aluminum-base brazing alloy containing silicon as a primary alloying element to form a composite having a cladding on one side occupying from about 1% to about 15% of the total composite thickness, said aluminum-base core material containing at most a trace amount of chromium;
    (b) rolling said composite to form a sheet product;
    (c) annealing said sheet product to a substantially strain-free state;
    (d) cold working said sheet product to a reduction of from about 3% to about 20%;
    (e) roll forming said sheet product into a tube with flattened sides and with the cladding on the exterior; and
    (f) joining said tube to aluminum-base fin stock at said flattened sides by vacuum brazing.

16. A method according to claim 15 in which said aluminum-base core material contains at least one member selected from the group consisting of manganese and magnesium as primary alloying elements and said aluminum-base brazing alloy further contains an alkali or alkaline earth metal gettering agent in an amount sufficient to substantially prevent the formation of oxides on the composite surface during the brazing procedure of step (f).

17. A method according to claim 15 in which step (e) is conducted at a temperature of from about 1000° F. to about 1200° F. and at a pressure of less than about $10^{-2}$ torr.

18. A method according to claim 15 in which step (e) is conducted at a temperature of from about 1060° F. to about 1125° F. and at a pressure of from about $10^{-4}$ torr to about $10^{-6}$ torr.

19. A wrought aluminum vacuum brazing sheet product having improved resistance to intergranular corrosion, formed by:
    (a) annealing a composite sheet product comprising an aluminum-base core material containing at most a trace amount of chromium clad with an aluminum-base brazing alloy to a substantially strain-free state; and
    (b) cold working said annealed sheet product to a reduction of from about 3% to about 20%.

* * * * *